2 Sheets—Sheet 1.
S. AINSWORTH.
FLEXIBLE PIPE JOINT COUPLING.
No. 81,572.  Patented Sept. 1, 1868.
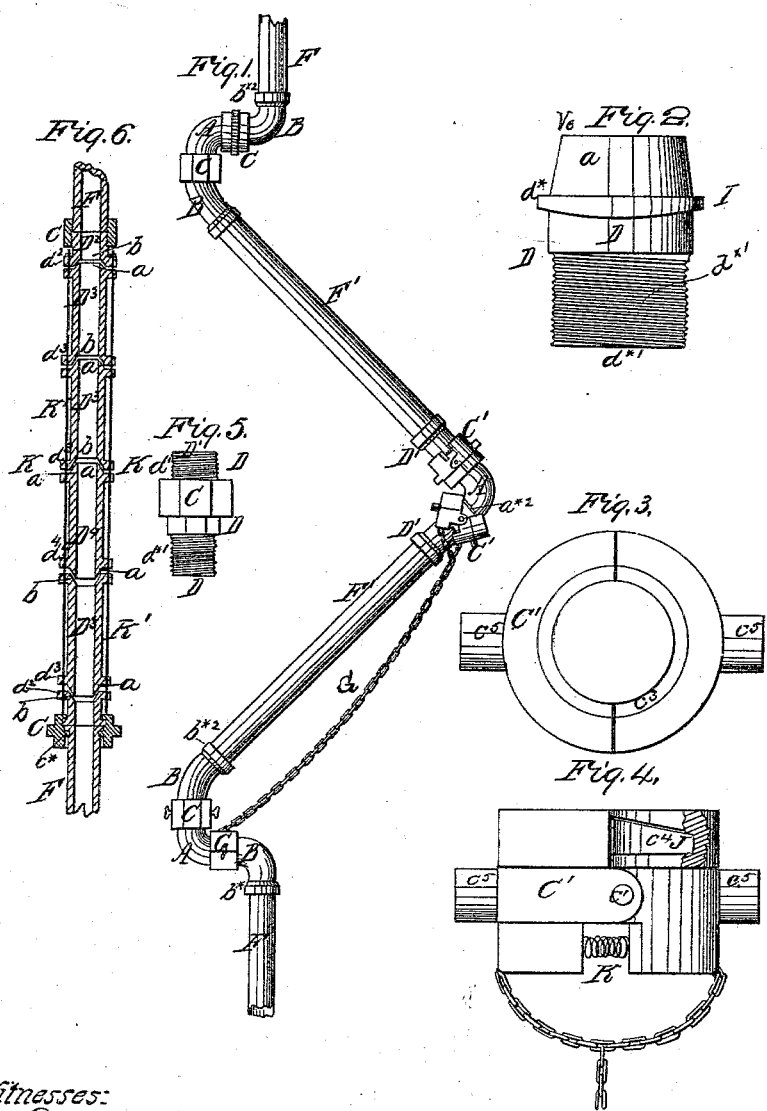
Witnesses:
Francis L. Clark
William R. Ford
Inventor:
Squire Ainsworth 2 Sheets—Sheet 2.
S. AINSWORTH.
FLEXIBLE PIPE JOINT COUPLING.
No. 81,572. Patented Sept. 1, 1868.
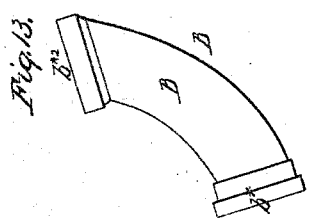
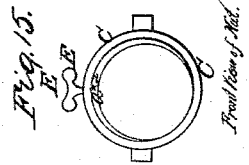
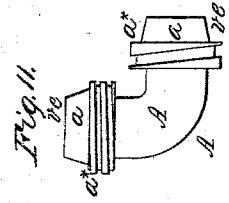
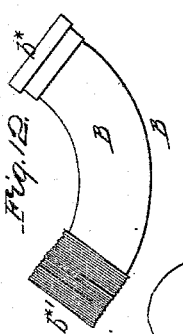
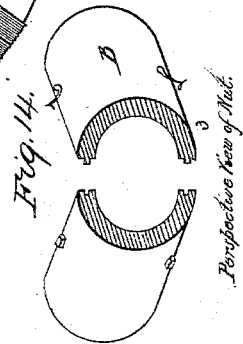
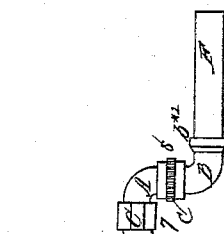
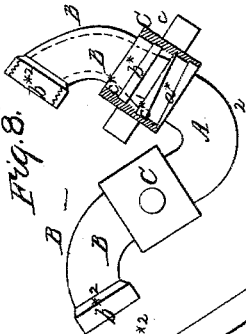
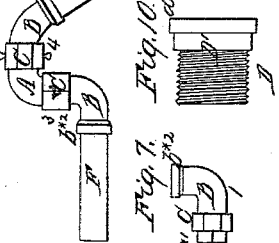
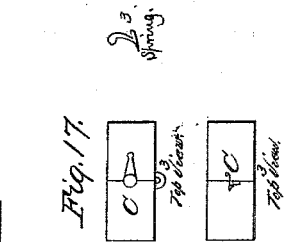
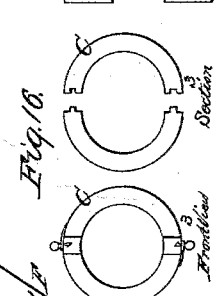
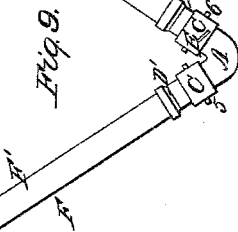
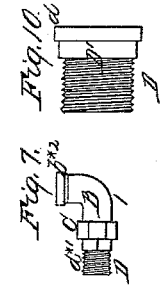
Witnesses:
Samuel W. Richards
Robt. C. Wilkins.
Inventor:
Squire Ainsworth

United States Patent Office.

SQUIRE AINSWORTH, OF PITTSBURG, PENNSYLVANIA.

*Letters Patent No. 81,572, dated September 1, 1868.*

IMPROVEMENT IN FLEXIBLE PIPE-JOINT COUPLINGS.

The Schedule referred to in these Letters Patent and making part of the same.

TO ALL WHOM IT MAY CONCERN:

Be it known that I, SQUIRE AINSWORTH, of Pittsburg, in the county of Allegheny, and State of Pennsylvania, have invented a certain new and useful Joint or Coupling for Steam and other Pipes; and I do hereby declare the following to be a full, clear, and exact description thereof, reference being had to the accompanying drawings, which are made a part of this specification.

My invention is intended, primarily, for connecting the heating-apparatus in a train of railroad-cars, but is also capable of use in any other connection where a swivel or universal joint is necessary, either in steam, gas, or other pipes.

My invention consists, first, in making the joint proper of conical or V-form; and secondly, in a novel construction of coupling-nut, and an arrangement for adapting the pipes to automatically uncouple, in case of accident, as hereinafter more fully described.

In the drawings—

Figure 1 represents an elevation of a combination of swivels, elbows, &c., for connecting the steam-heating apparatus in a pair of railroad-cars, showing the "spring coupling-nut" in the act of opening.

Figure 2 is a view, on an enlarged scale, of a "male swivel," detached.

Figures 3 and 4 are different views, on the same scale as fig. 2, of the spring coupling-nut, detached, a portion in one of the views being broken away to more clearly illustrate its construction.

Figure 5 represents a "straight joint."

Figure 6 is a longitudinal section of a "spring swivel-joint" of a number of sections.

Figure 7 represents a "single-elbow joint."

Figure 8 represents a double-elbow joint.

Figure 9 is an elevation of a combination of swivels, elbows, &c., similar to that represented in fig. 1, with a different form of "coupling-nut."

Figure 10 is a detached view of a "female swivel."

Figure 11 is a detached view of a "centre male elbow."

Figures 12 and 13 are detached views of different forms of "female elbows."

Figures 14, 15, 16, and 17 represent, respectively, different forms of "nuts."

Similar letters of reference indicate corresponding parts in the several figures.

$a$ and $b$ represent, respectively, the male and female parts of my conical or "V"-joint, said parts being so ground as to be perfectly steam-tight without packing, and yet to allow of being freely turned, which is readily accomplished by the ordinary modes of grinding.

A (figs. 1, 8, 9, and 11) represents what I term a "centre male elbow." Each end of this elbow is tapered so as to form a male "V," $a$, and is also provided with an external screw-thread or groove, $a^*$, as represented in figs. 8, 9, and 11, or flange $a^{*1}$, as represented in fig. 1.

B B represent "female elbows," being provided at one end with a conical or V-shaped cup, (forming the female "V" $b$,) for the reception of the tapered end, $a$, of the elbow A, or a corresponding part, and having an external flange, $b^*$, to adapt it to be clamped thereto. At the other end, said elbow is provided with the customary internally-threaded socket $b^{*2}$, or externally-threaded as at $b^{*1}$, for attachment to the end of a pipe.

C represents a clamping-nut, which may be of any of the different external forms represented, and internally is provided with a flange or shoulder, $c^*$, for engagement with the flange $b^*$ of the elbow B, or a corresponding part, and a screw-thread, $c^{*1}$, for engagement with the external thread $a^*$, on the elbow A, or a corresponding part. Said nut may be also provided with a set-screw, E, for the purpose of locking it in position, and, if preferred, be divided longitudinally, as represented in figs. 9, 14, and 16, or transversely, as represented in fig. 17, to facilitate withdrawal, being in either case provided with a tongue-and-groove or other suitable joint, and any suitable fastening.

C' represents the spring coupling-nut, the construction of which will be best understood by reference to figs. 2 and 4. This nut is composed of two parts, hinged together at $c^1$ and recessed at $c^2$, so as to adapt the end in which said recesses are provided, to be collapsed, to open the other end, as represented in fig. 1. This nut is provided internally with a flange, $c^3$, in line with its hinging pivots, for engagement with the externally-flanged end of a "female swivel," $D^1$, or a corresponding part, and at its front end with a groove, $c^4$, corresponding in form with the flange $a^{*1}$ of the centre elbow A, or a corresponding part, for engagement with said part.

A pair of coiled springs, K, applied in the recesses $c^2$, serve to hold the coupling in its closed position. $c^5 c^5$ are lugs, to adapt it to be operated by hand.

In addition to the provision for uncoupling by hand, (which is all that is necessary, except when the device is used for coupling the steam-apparatus of cars, and even in that case when no automatic uncoupling-arrangement is provided in the car-couplings,) said nut or nuts may be provided with suitable holes or staples for the attachment of a chain or chains, G, the other end of which is attached to the car or to the stationary pipes, as shown in fig. 1, its length being so adjusted as that any unusual opening of the cars, by first acting on it, shall open the spring-nut, and separate the two parts of the coupling, thus preventing the possibility of the pipes separating in any other place, in case of such occurrence.

D (figs. 2, 5, and 7) represents a "male swivel," which is provided at one end with a male "V," $a$, and a suitable external flange, $d^*$, or screw, threaded for engagement with a coupling-nut, and at the other with an external or internal screw-thread, $d^{*1}$, for attachment to the correspondingly-provided end of a pipe.

$D^1$ represents the "female swivel," which is provided at one end with a flaring or V-shaped cup, forming the female "V," $b$, for the reception of the corresponding end, $a$, of the swivel D, or a corresponding part and an external flange or screw-thread, $d^1$, for the reception of the clamping-nut, and an external or internal screw-thread, $d^{1*}$, for attachment to the end of a pipe.

$D^2 D^3 D^4$, fig. 6, represent different forms of swivels, for forming a "straight spring swivel-joint," their external flanges $d^2 d^3 d^4$ being perforated for the reception of straight springs K', which serve to return them to a normal position after being turned therefrom. Any suitable means may be employed for connecting them, and their number increased or diminished as may be found necessary.

F F, figs. 1, 6, and 9, represent the stationary pipes, and F' F' sections of pipe for imparting the necessary length to the coupling.

It is obvious that the springs K' may also be applied to combinations of elbows, or elbows and swivels, in the same or a similar manner to that in which they are applied to swivels alone, when desired.

The manner of applying and connecting the different parts, to form the different combinations, will be readily-understood, by one acquainted with the art to which my invention belongs, without detailed description, the male of each part fitting alike the female of every other part, and *vice versa*.

I am aware that a ball-and-socket joint may be made to operate for the purpose herein set forth, but its operation is imperfect, and its adaptedness is soon impaired. Its tendency to "dip" requires greater strength in the lateral support, and consequently produces greater friction. Its wear soon enlarges the space surrounding the ball, without the possibility of repair, and hence permits leakage for a time, or the early abandonment of the joint and the parts connecting it. In the present apparatus all these evils are avoided. The conoid form of the joint permits the descent, like a wedge, of the male part, rather inducing a closer and better fitting as long as the joint shall remain in use.

I therefore claim—

1. A pipe-connection, consisting of a conical recess in the end of one pipe, and a frustum of a cone at the termination of the end of the other, said pipes being so held together, by a clamp or other adequate means of support, as to permit the rotary movement of one or both of the said pipes without variation from the plane of said movement, all as and for the purpose heretofore described.

2. In combination with the foregoing, the spring-hinged coupling-nut C', constructed substantially in the manner described, for the purpose specified.

3. The chain G, in combination with the spring-coupling C', substantially as and for the purpose set forth.

SQUIRE AINSWORTH.

Witnesses:
JAMES L. EWIN,
J. E. M. BOWEN.